(12) United States Patent
Wang et al.

(10) Patent No.: US 7,079,384 B2
(45) Date of Patent: Jul. 18, 2006

(54) PORTABLE COMPUTER AND DOCKING STATION LOCKING STRUCTURE

(75) Inventors: Wen-Chieh Wang, Banchiau (TW); Chao-Ming Huang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 199 days.

(21) Appl. No.: 10/750,770

(22) Filed: Jan. 5, 2004

(65) Prior Publication Data
US 2005/0207110 A1    Sep. 22, 2005

(30) Foreign Application Priority Data
Nov. 10, 2003   (TW)   ............................... 92219892 U

(51) Int. Cl.
*G06F 1/16* (2006.01)
(52) U.S. Cl. ........................ 361/686; 248/918; 70/247
(58) Field of Classification Search .................. 70/247; 248/551, 920, 918; 361/679–687, 724–727; 710/303; 439/131
See application file for complete search history.

(56) References Cited

U.S. PATENT DOCUMENTS

| | | | |
|---|---|---|---|
| 5,645,261 A * | 7/1997 | Glynn ........................ 248/551 |
| 6,430,038 B1 * | 8/2002 | Helot et al. ................. 361/681 |
| 6,856,506 B1 * | 2/2005 | Doherty et al. ............. 361/683 |
| 2002/0033033 A1 * | 3/2002 | Hasegawa ..................... 70/247 |

* cited by examiner

*Primary Examiner*—Hung Van Duong
(74) *Attorney, Agent, or Firm*—Bacon & Thomas, PLLC

(57) ABSTRACT

A portable computer and docking station locking structure in which the docking station has a lock provided inside the support arm thereof controlled by a key or the like, and the portable computer has a lock hole in the back side adapted to receive the swivel locking member of the lock for enabling the portable computer to be locked to the docking station after setting of the portable computer in the support arm of the docking station.

4 Claims, 3 Drawing Sheets

PORTABLE COMPUTER AND DOCKING STATION LOCKING STRUCTURE

BACKGROUND OF THE INVENTION

1. Field of the Invention

The present invention relates to a portable computer and docking station locking structure and, more particularly to such a portable computer and docking station locking structure, which has lock means for locking the portable computer to the docking station after positioning of the portable computer in the docking station.

2. Description of Related Art

A portable computer, for example, a tablet PC (personal computer) may be used with a docking station, which has a support arm for holding the tablet PC in a tilted position for operation.

However, a conventional docking station does not have any lock means to lock the portable computer, i.e., the portable computer is simply placed on the docking station for operation and can be carried away from the docking station freely when desired. Because the portable computer is not locked to the docking station, it can easily be taken away from the docking station by someone unlawfully.

SUMMARY OF THE INVENTION

The present invention has been accomplished under the circumstances in view. It is therefore the main object of the present invention to provide a portable computer and docking station locking structure, which enables the user to lock the portable computer to the docking station, preventing other people from taking the portable computer away from the docking station.

To achieve this and other objects of the present invention, the portable computer and docking station locking structure comprises a docking station and a portable computer. The docking station comprises a base, and a support arm provided at a top side of the base. The support arm has a supporting face disposed at the front side thereof and a holding groove disposed at the bottom side of the supporting face. The portable computer is positioned in the holding groove of the support arm, and rested on the supporting face.

The main feature of the present invention is that a lock is provided inside the support arm. The lock comprises at least one locking member controlled to protrude outside the supporting face. Further, the portable computer has at least one lock hole formed in the back side thereof adapted to receive the at least one locking member of the lock when protruded.

The portable computer can be a tablet PC. The lock can be a swivel lock controlled by a key, or a magnetic lock controlled by the portable computer or an external computer through a code.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
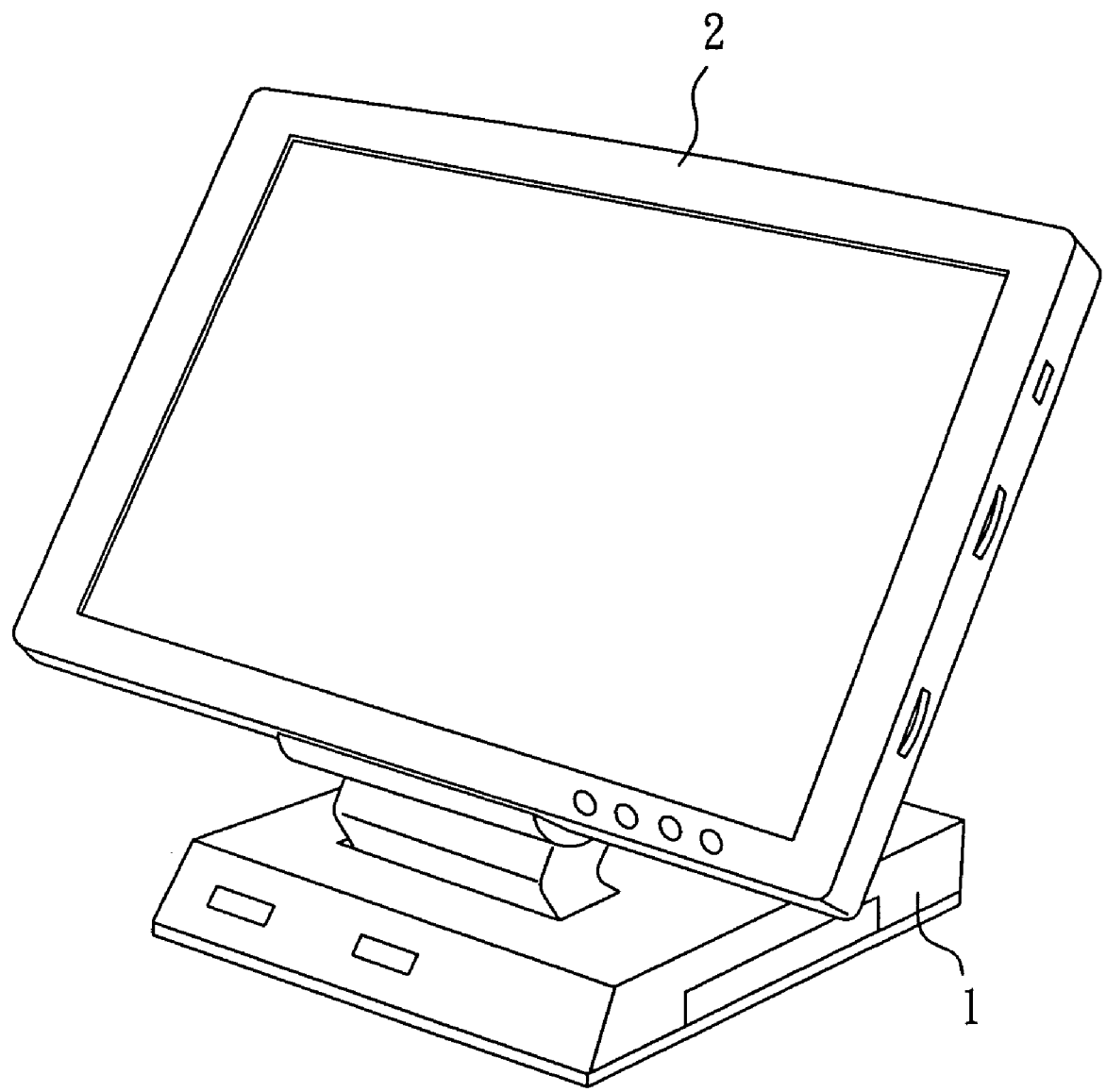
FIG. 1 is an elevational view of the present invention, showing the portable computer supported on and locked to the docking station.

Referring to FIG. 1, a portable computer 2 is supported on a docking station 1. The portable computer 2 according to this embodiment is a tablet PC.

Figure 2:
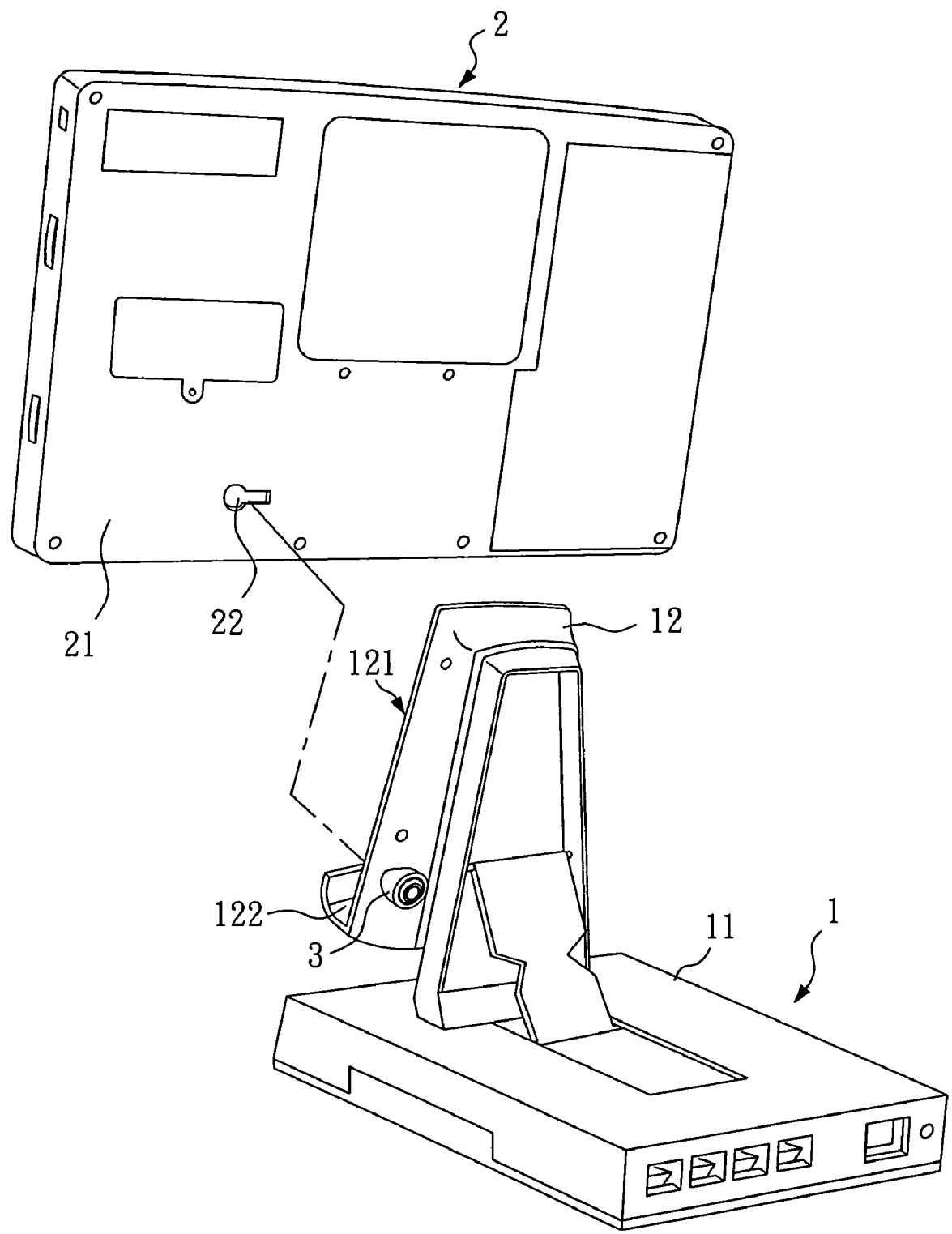
FIG. 2 is an exploded view of the portable computer and docking station locking structure according to the present invention.
Figure 3:
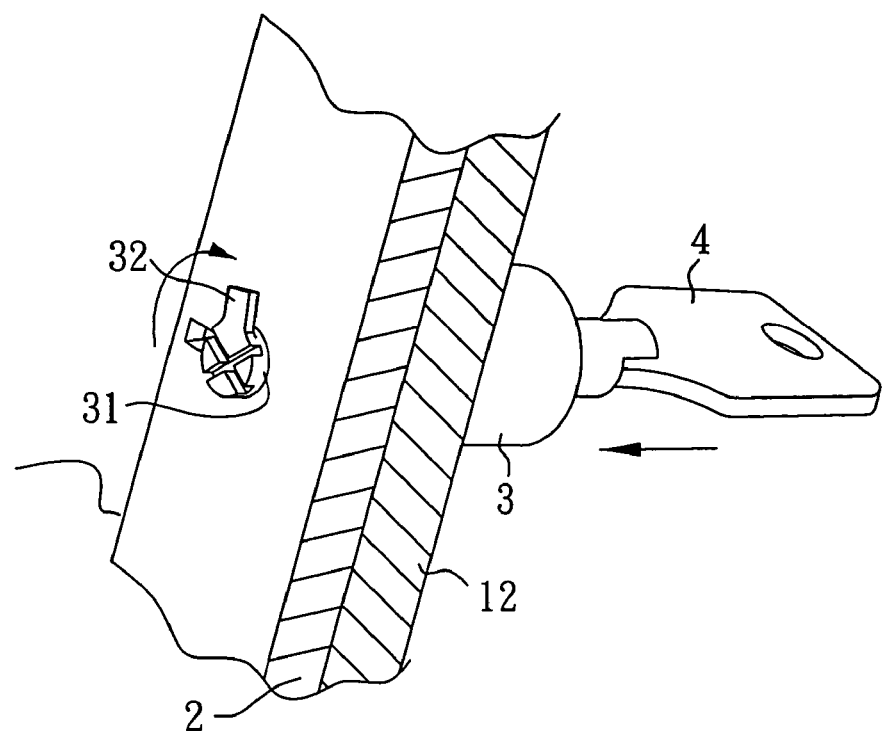
FIG. 3 is an enlarged view of the lock shown in FIG. 2.

Referring to FIGS. 2 and 3 and FIG. 1 again, the docking station 1 comprises a base 11, and a support arm 12. The support arm 12 is provided at the top side of the base 11, having a supporting face 121 disposed at the front side and a holding groove 122 disposed at the bottom side of the supporting face 121. The portable computer 2 is positioned in the holding groove 122 of the support arm 12 of the docking station 1 and rested on the supporting face 121 of the support arm 12.

Further, a lock 3 is provided inside the support arm 12. According to this embodiment, the lock 3 is a swivel lock comprising a spindle 31. The locking member 32 is a hook radially extended from the front end of the spindle 31 for synchronous rotation with the spindle 31, and controlled to protrude outside the supporting face 121 of the support arm 12. The portable computer 2 has a lock hole 22 in the back side 21 adapted to receive the locking member 32 of the lock 3 when protruded.

After the portable computer 2 has been set in the docking station 1, the user can use the key 4 to rotate the spindle 31 of the lock 3 and to further force the locking member 32 into engagement with the lock hole 22, keeping the portable computer 2 locked to the docking station 1.

Figure 4:
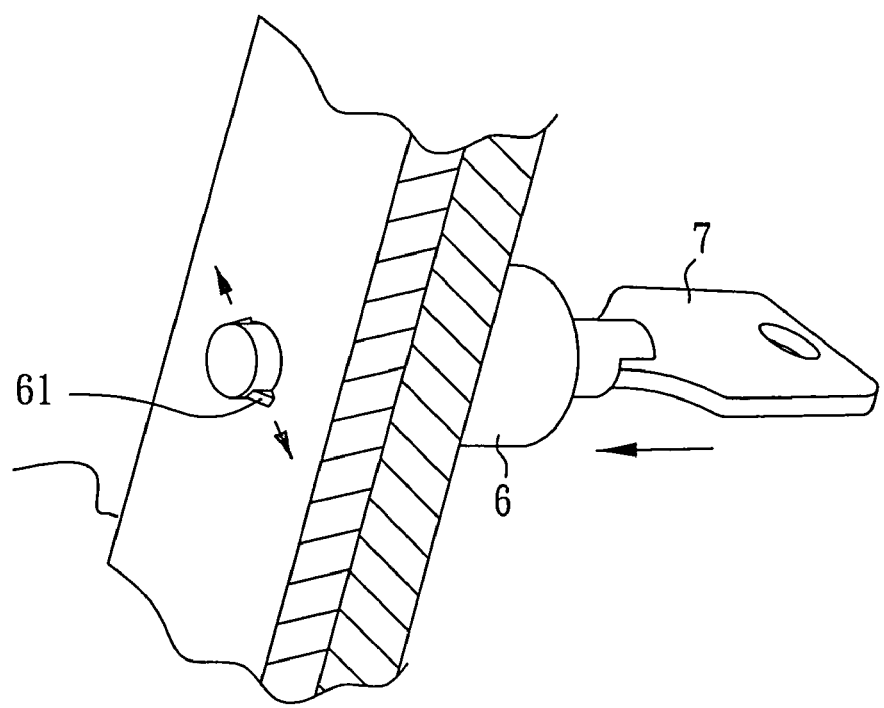
FIG. 4 is a schematic drawing showing an alternate form of the lock according to the present invention.

FIG. 4 shows an alternate form of the lock. According to this embodiment, the lock, referenced by 6, has two reversed locking members 61. Rotating the key, referenced by 7, in the lock 6 causes the locking members 61 to be moved inwards or outwards in the lock hole 22 of the portable computer 2 (see also FIG. 2) in reversed directions between the locking position and the unlocking position.

The lock for the portable computer and docking station locking structure may be variously embodied. A magnetic lock may be used as a substitute, and controlled by the portable computer through a code. Alternatively, the magnetic lock can be controlled by an external computer.

A prototype of portable computer and docking station locking structure has been constructed with the features of FIGS. 1~4. The portable computer and docking station locking structure functions smoothly to provide all of the features discussed earlier.

Although particular embodiments of the present invention have been described in detail for purposes of illustration, various modifications and enhancements may be made without departing from the spirit and scope of the invention. Accordingly, the invention is not to be limited except as by the appended claims.

What is claimed is:

1. A portable computer and docking station locking structure comprising:

a docking station, said docking station comprising a base, and a support arm provided at a top side of said base, said support arm having a supporting face disposed at a front side thereof and a holding groove disposed at a bottom side of said supporting face; and a portable computer positioned in said holding groove of said support arm and rested on said supporting face;

wherein, said docking station comprises a lock provided inside said support arm, said lock comprising at least one locking member controlled to protrude outside said support face; and wherein said computer has at least one lock hole formed in a back side thereof adapted to receive the at least one locking member of said lock when said locking member protrudes outside said support face.

2. The portable computer and docking station locking structure as claimed in claim 1, further comprising a key to lock or unlock said lock.

3. The portable computer and docking station locking structure as claimed in claim 1, wherein said lock is a swivel lock, said swivel lock comprising a spindle, and said at least one locking member includes a hook radially extended from a front end of said spindle for synchronous rotation with said spindle.

4. The portable computer and docking station locking structure as claimed in claim 1, wherein said portable computer is a tablet PC (personal computer).

* * * * *